United States Patent [19]

Knecht et al.

[11] Patent Number: 4,833,920
[45] Date of Patent: May 30, 1989

[54] DIFFERENTIAL PRESSURE SENSOR

[75] Inventors: Thomas A. Knecht, Eden Prairie; Roger L. Frick, Chanhassen; Steven M. Bruesehoff, Waconia, all of Minn.

[73] Assignee: Rosemount Inc., Eden Prairie, Minn.

[21] Appl. No.: 879,938

[22] Filed: Jun. 30, 1986

[51] Int. Cl.$^4$ .......................... G01L 7/08; G01L 9/04; G01L 9/12
[52] U.S. Cl. ........................... 73/717; 73/720; 73/724; 92/97; 361/283
[58] Field of Search .................. 73/715–729, 73/146.3; 51/324; 29/454, 445, 163.5 R; 92/97; 338/4; 361/283

[56] References Cited

U.S. PATENT DOCUMENTS

| | | | |
|---|---|---|---|
| 3,079,576 | 2/1963 | Kooiman | 338/4 |
| 3,465,481 | 9/1969 | Szwarcman | 51/324 |
| 3,566,750 | 3/1971 | Allen | 92/97 |
| 3,618,390 | 11/1971 | Frick | 73/398 C |
| 3,650,181 | 3/1972 | Parr | 92/97 |
| 3,793,885 | 2/1974 | Frick | 73/398 C |
| 3,800,413 | 4/1974 | Frick | 29/592 |
| 3,962,921 | 6/1976 | Lips | 73/398 C |
| 4,064,549 | 12/1977 | Cretzler | 361/283 |
| 4,064,550 | 12/1977 | Dias et al. | 361/283 |
| 4,389,895 | 6/1983 | Rud, Jr. | 73/724 |
| 4,442,474 | 4/1984 | de Jong | 361/283 |
| 4,519,255 | 5/1985 | Ishii | 73/727 |
| 4,531,415 | 7/1985 | Orlowski et al. | 73/718 |
| 4,572,000 | 2/1986 | Kooiman | 73/718 |
| 4,578,735 | 3/1986 | Knecht et al. | 361/283 |
| 4,603,371 | 7/1986 | Frick | 361/283 |

FOREIGN PATENT DOCUMENTS 008572 3/1980 Fed. Rep. of Germany .

OTHER PUBLICATIONS

"Technology Report Sensor ICS: Processing, Materials Open Factory Doors", *Electronic Design*, Apr. 18, 1985, pp. 133–148.
"Pressure Technology and Related Products", distributed by Metrology General Corporation, pp. 1–24, 1980.

*Primary Examiner*—Donald O. Woodiel
*Attorney, Agent, or Firm*—Nickolas E. Westman

[57] ABSTRACT

A cell for sensing differential pressures has a single brittle material diaphragm mounted on support plates positioned on opposite sides of the diaphragm. The diaphragm surfaces when at zero differential pressure facing the support are concave and shaped to conform very closely to the shape the diaphragm has when it is deflected so that when the diaphragm is under a selected pressure and it is forced against one of the supports in either direction, the diaphragm is substantially planar or flat and supported fully on its support plate. The diaphragm may be shaped by placing it under a pressure so that it bows or deflects and then grinding the surface opposite from the applied pressure flat. When the pressure is removed, the diaphragm relaxes and a cavity with the exact required shape is produced on the surface that had been bowed out and ground flat. The same procedure can be done to the other side of the diaphragm or two diaphragm sections may be fixed together.

26 Claims, 3 Drawing Sheets

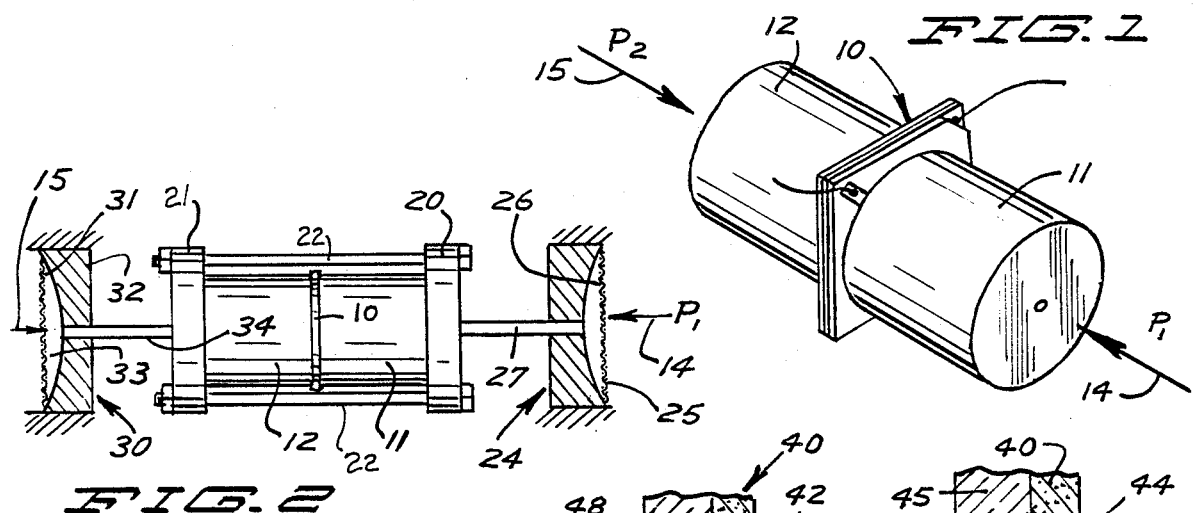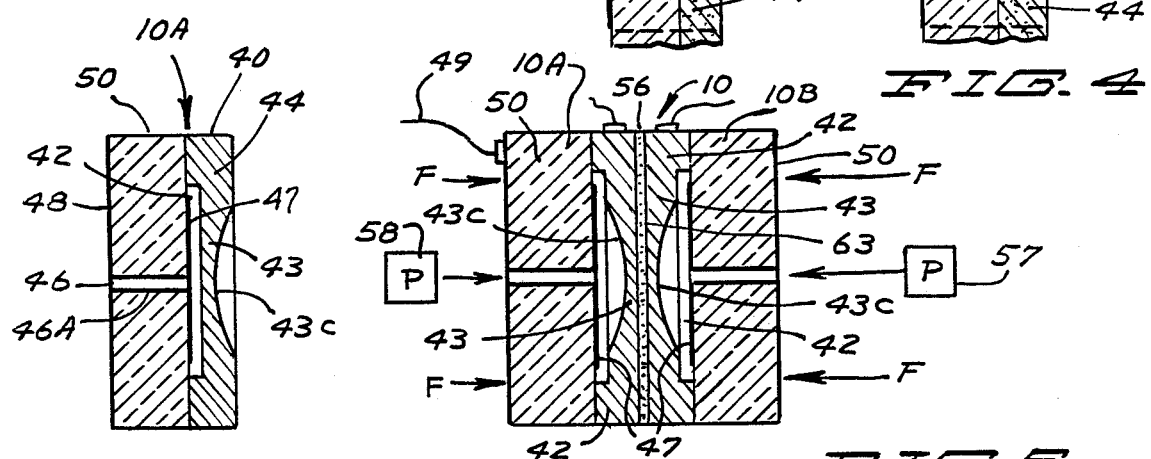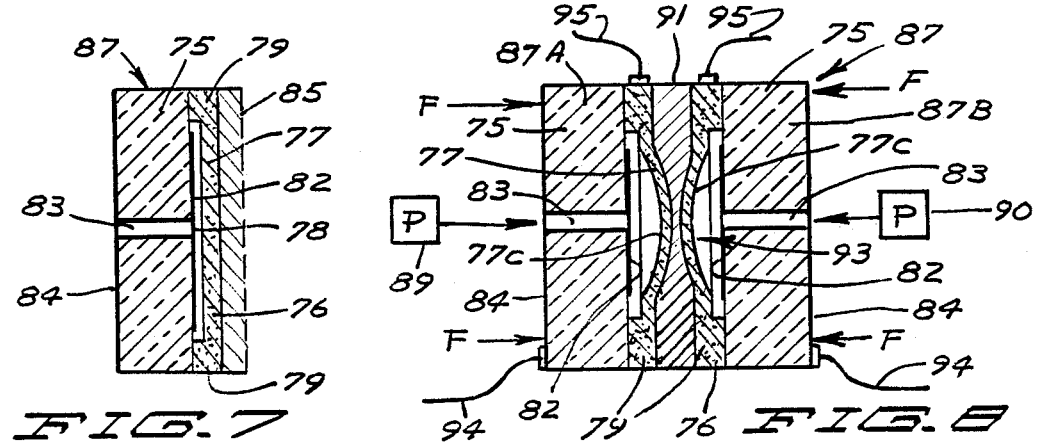

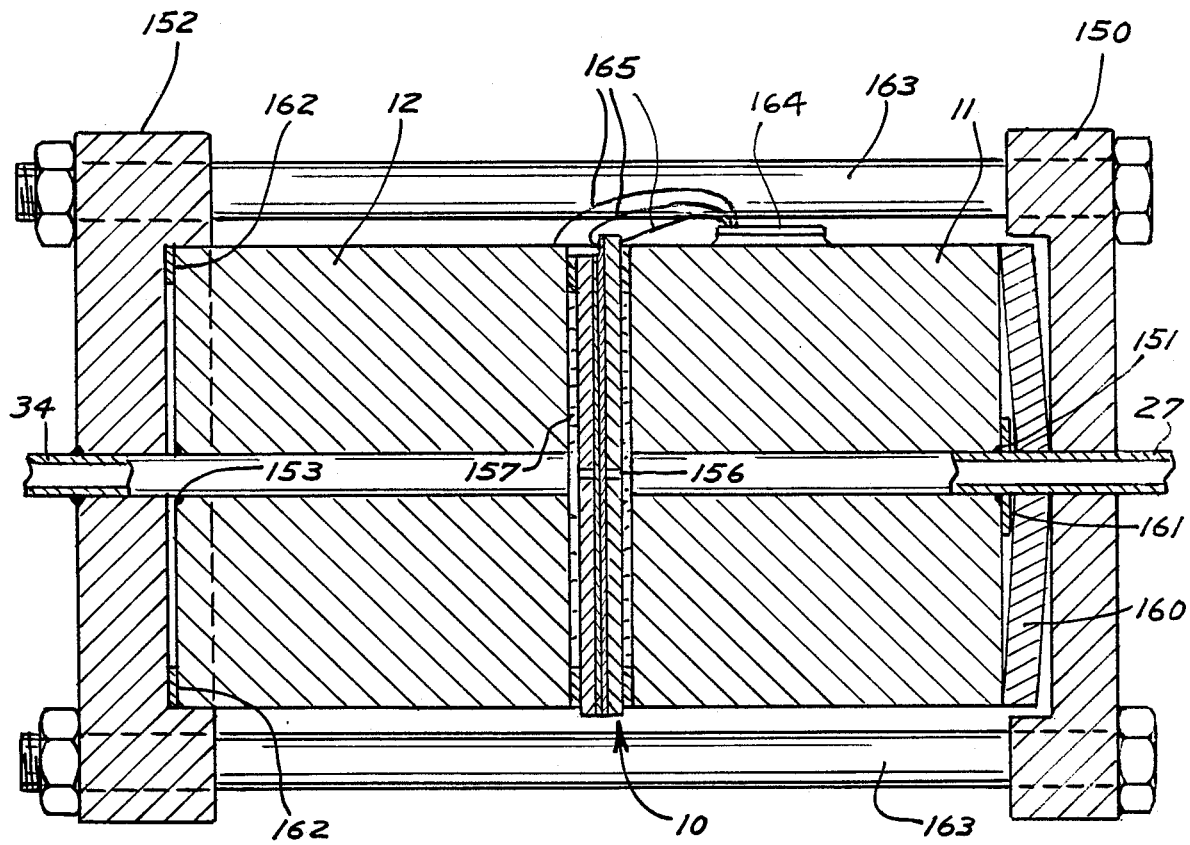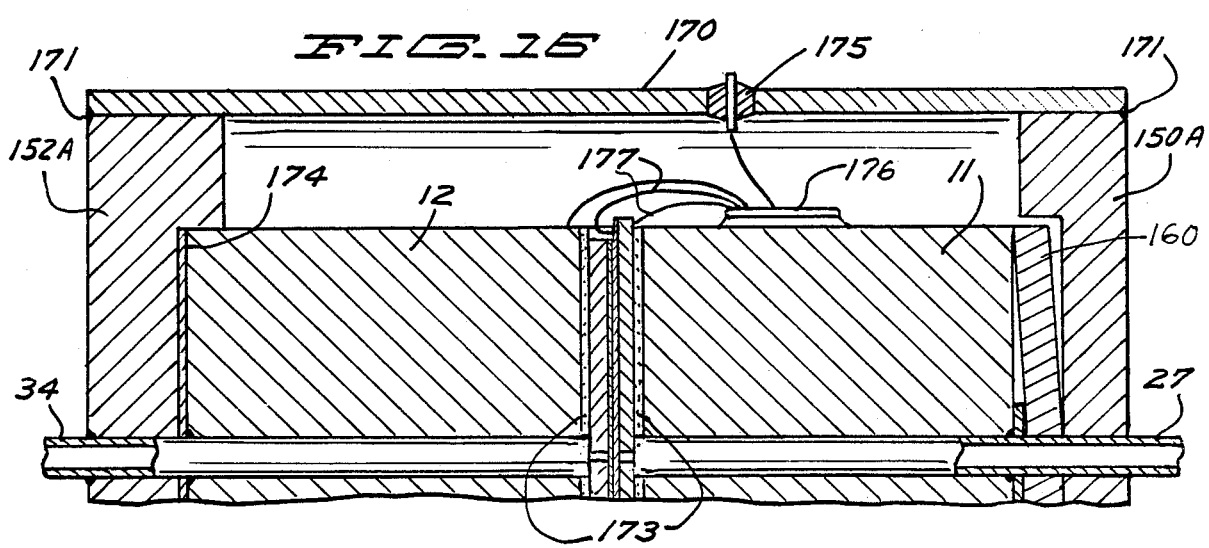

DIFFERENTIAL PRESSURE SENSOR

BACKGROUND OF THE INVENTION

1. Field of the Invention.

The present invention relates to batch fabricated differential pressure cells having diaphragms formed of brittle materials which are provided with overpressure protection, and mounted in a housing to insure proper operation at a subtantial range of static line pressure.

2. Description of the Prior Art.

U.S. Pat. No. 4,572,000 shows a pressure sensor having a brittle diaphragm which when at an overpressure is flat against a flat support plate. In this patent, the diaphragm is bulged outwardly from its support plate under an initial pressure and made so that it will rest against the support plate and be substantially flat when under maximum pressure.

Additional prior devices utilizing brittle diaphragms that have edge support rims also are known, wherein the sensing may be done by capacitance sensing or using strain gages mounted on the diaphragm itself.

SUMMARY OF THE INVENTION

The present invention relates to pressure sensing cells using a single silicon active diaphragm which is constructed so that the diaphragm is supported between flat support plates or members and is shaped to have concave surfaces, at zero pressure differential, each one facing one of the support members. The concacve surface is formed so that at rest it is formed precisely in the deflected shape of the diaphragm, so that when the pressure being sensed acts to move the diaphragm toward a support surface, the diaphragm surface facing the support will be flat and will be fully supported against the support. The full diaphragm support prevents overstresses that may crack or damage the brittle material of the diaphragm. The diaphragm is preferrably made of material such as silicon, sapphire, germanium or other semi-conductor or a suitable ceramic material.

The methods of construction solve the problem of forming the cavity in the surface of the silicon diaphragm facing the supports at the proper shape, and does not require forming or shaping a surface of the support layer. The support layer is preferably made of glass and when capacitive sensing is used such glass support layers will have metal capacitor plates deposited thereon.

The concave diaphragm surfaces are preferably formed in batch processes, that is forming several diaphragms on a wafer onto which the support discs are bonded. After forming, the wafer and support discs may be cut up into individual cells.

The diaphragm surfaces can be formed by deflecting the diaphragm under pressure during manufacturing, and lapping or grinding the opposite surface flat while the diaphragm is under pressure. When the pressure is removed a cavity with exactly the desired shape is produced on the surface that was lapped or ground.

The opposite side of the diaphragm from the one having the convex shape can then be processed in the same way to have a second concave surface formed on the diaphragm. The diaphragm also can be formed using two diaphragm sections or halves each of which has one concave surface. The two sections are bonded together at their interface, so that the final assembly has two outwardly facing concave surfaces over which two support layers can be bonded. Openings are provided in the support layers to admit the pressures to be sensed.

An alternate method of construction is to use two wafers having diaphragm halves that are bowed under pressure, and then bonding the outer surfaces of the wafers together while the diaphragm halves are held bowed under pressure. The bonding material is settable and after it is set the bonding material will hold the diaphragms in their pressurized shape even after the pressure is removed. Then, the support discs are bonded to opposite sides of the wafers.

The diaphragms in each form are used for sensing differential pressures and when pressure is applied to one side of the diaphragm it will move toward a provided support plate surface and the diaphragm surface will be flat when it contacts such support surface, to thereby be fully supported against excessive overpressures.

The sensing cells are clamped into housings comprising massive structures of a material with a matching temperature coefficient of expansion matching that of the pressure sensing cells to hold the cells together and maintain compression on the cell perimeters. The clamp structure also has passageways to admit pressure to the assembly, and by proper selection the clamp structure or housing configuration can provide mechanical compensation for spacing changes of the diaphragm that occur under different static pressure conditions of the pressures being sensed. This compensation technique is useful for sensors which are capacitive sensors. The static pressure is the average pressure on the opposite sides of the diaphragm, and in most instances static pressure of several of hundreds and even thousands of pounds per square inch can be in the lines leading to the differential pressure sensor, while the sensed differential may be as low as one pound per square inch. The sensors are required to operate at static line pressures that vary from low to high. Properly locating the regions where the sensor cells are clamped together, and controlling the seal area that affects deflection of the sensor, allows compensation for different static line pressures to be obtained by controlling and changing the radial tension on the diaphragms, which in turn affects the diaphragm stiffness, and thus its deflection response to a given differential pressure acting on the diaphragm. As static pressure increases the spacing between the diaphragm surfaces which form one sensing capacitor plate and the associated support surface which has the other capacitor plate on it, changes in that these surfaces tend to separate as the static pressure increases. By clamping the cell in its housing so the diaphragm radial tension decreases, at the same time, compensation is possible.

All of the sensors can be made in batch processes for cost reduction. Batch processes generally envision the use of a wafer of semi-conductor that will have several of the diaphragms formed on the wafer during the processing steps, and bonding the wafer or discs of glass which form the support plates, and then cutting the wafer into individual sensor cells when the processing is completed.

BRIEF DESCRIPTION OF THE DRAWINGS

FIG. 1 is a schematic perspective view of a sensor cell made according to the present invention showing a backing structure for the sensor cell in position;

FIG. 2 is a schematic view showing the device of FIG. 1 clamped in a housing and schematically showing isolator diaphragms for transferring pressures to the sensor cell;

FIG. 3 is a sectional view through a typical diaphragm and support plate showing an initial stage of manufacture in a batch process, but illustrative by showing only one cell;

FIG. 4 is a sectional view substantially the same as FIG. 3 showing a further step in manufacture;

FIG. 5 shows a finished individual sensor section or sensor half with a diaphragm surface formed according to the present invention;

FIG. 6 is a further view of an assembly of a pressure sensor cell made utilizing two of the sensor portions shown in FIG. 5;

FIG. 7 is a sectional view of a diaphragm and support plate forming a half of a sensing cell made according to a second form of the invention;

FIG. 8 is a sectional view showing two of the diaphragm and support plate assemblies of FIG. 7 assembled into a pressure sensing cell;

FIG. 15 is a sectional view through a sensor assembly showing a preferred clamping arrangement of the sensor cells disclosed herein to an outer housing; and FIG. 16 is a fragmentary sectional view of modified clamping housing arrangement.

DETAILED DESCRIPTION OF THE PREFERRED EMBODIMENTS

Figure 9:
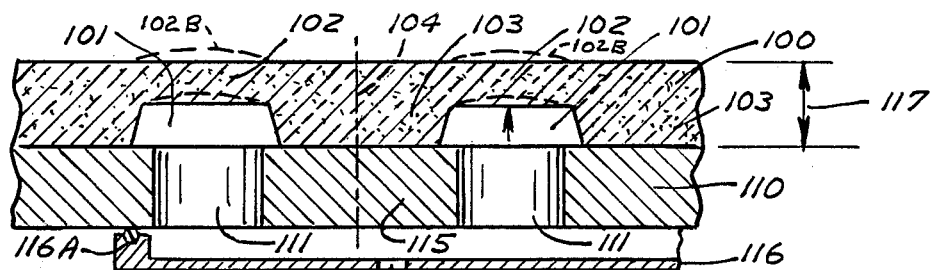
FIG. 9 is a sectional view of a typical batch process arrangement for making sensing cells according to the present invention by a modified process.
Figure 10:
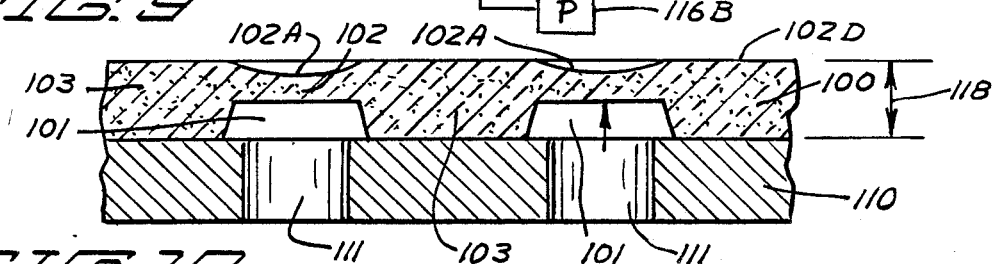
FIG. 10 is a sectional view showing the device of FIG. 9 in a further step of manufacturing pressure sensing cells.
Figure 11:
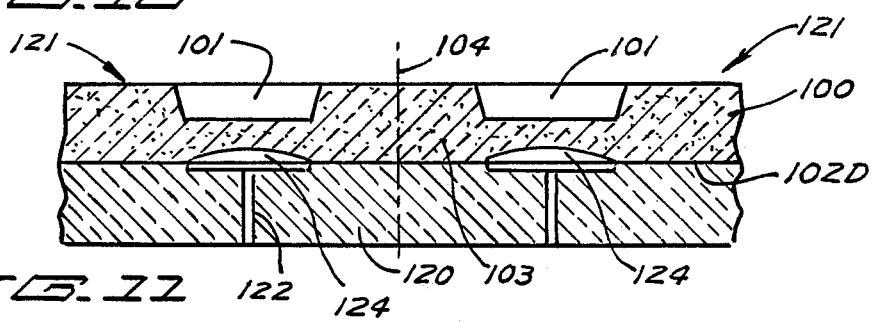
FIG. 11 is a sectional view showing a step of mounting a partially formed diaphragm onto a support plate.

FIG. 1 illustrates a single diaphragm differential pressure sensor cell indicated generally at 10 that is placed between a first housing support cylinder member 11 and a second housing support cylinder member 12. Each cylinder is made of glass, such as Pyrex, or other suitable material, and has an opening or passageway extending along the central axis for admitting to the cell two pressures represented as P1 by arrow 14, and P2 by arrow 15. The sensor cell 10 is clamped between the cylinders 11 and 12 generally as shown in FIG. 2. The clamp can have end caps or frames 20 and 21 held together with bolts 22 to clamp the cylinders 11 and 12 against the sensor cell 10. In FIG. 2, also schematically shown are first and second isolators 24 and 30 which are used for transmitting, in a known manner, pressures to the sensor cell 10 through the passageways in cylinders 11 and 12, respectively, without subjecting the sensor cell diaphragm to the pressure media to be sensed.

Pressure isolation is a well-known technique, and as shown, the isolator 24 includes an isolation diaphragm 25 that encloses a cavity 26 containing a non-compressible fluid such as a silicone oil that transmits pressure through piping 27 to the passageway in the center of the cylinder 11 and thus to one side of the diaphragm in the cell 10 as will be shown. The isolation diaphragm 25 is subjected to the direct pressure P1 indicated by arrow 14 in FIG. 2 as well. The isolator 30, as shown, has an isolation diaphragm 31 and this isolation diaphragm is mounted on a suitable support or block 32 to define a chamber 33 that is filled with an incompressible fluid which fills a line 34 leading to a central longitudinal opening in the cylinder 12 that is clamped against the opposite side of the sensor cell 10 from cylinder 11. The pressure P2 indicated by the arrow 15 thus also acts on the diaphragm 31. The differential pressure between pressures P1 and P2 will be sensed by the sensor cell 10.

One method of making a sensor cell with a single deflecting pressure sensing diaphragm using brittle materials such as silicon or other semiconductors for the diaphragm is shown in FIGS. 3–6. The completed sensor cell 10 is shown in FIG. 6 in exaggerated detail. It should be noted that the drawings are not to scale nor proportional as they would be in an actual device. The thickness of the layers and depth of cavities and recesses is greatly exaggerated for clarity of illustration.

The cell 10 is made in batch process. A wafer of silicon indicated generally at 40 is processed to provide a plurality of diaphragms, but only one such diaphragm is shown in detail.

The wafer 40 is etched to form recesses 42 in desired locations, as shown, and the recesses form thinner deflecting diaphragms 43 supported by rims 44 which are cut out of the wafer when the batch process is completed and the individual cells 10 are separated out. The individual cell periphery for one-half of a cell is indicated by solid lines in FIG. 3.

The wafer 40 is placed on top of a glass disc 45 that may be made of borosilicate glass such as Pyrex. The glass disc 45 is provided with a plurality of passageways or openings 46 therethrough in position to be in registry with the recesses 42 on the wafer 40. The glass discs 45 are metalized in a known manner to form thin layers of metal within the periphery of recesses 42. The metal layers form capacitor plates 47 for capacitive sensing of diaphragm deflection. The openings 46 have a metalized layer 46A extending therethrough to a metal layer 48 on the opposite side of the glass disc which can be used for attaching electrical leads to the capacitor plates 47 when the individual sensor cells have been formed. The metal layer 46A in the openings conduct electrical signals from the capacitor plates 47 to the respective layer 48 that can be used for attaching suitable leads such as that shown at 49. The diaphragm assemblies are thus in registry with a rigid base support layer 50 that is formed from the disc 45 made of glass.

The wafer and glass disc are bonded together, using anodic bonding or other bonding techniques, so that there is a bond beneath the rims 44 of the diaphragms and the glass disc to enclose the recess or cavity 42 and provide an opening thereto only through the opening 46.

In FIG. 4, a further step in the process of making the sensor cells is shown, wherein pressure is applied as indicated by the arrow 51 to each of the openings 46 (several openings in the glass disc would be pressurized at once), and in this way bow out the original diaphragm section or thin section 43 that is in registry with the recess 42. The diaphragm assumes the deflected shape generally as shown by the curved line 43A, and the dotted line 43B that is formed as the diaphragm is bowed outwardly. The pressure is held to keep the diaphragm 43 bowed, in its bowed shape caused by the pressure that is applied. Then, the external convex portion outlined by dotted line 43B will be lapped or ground off so that there is a flat surface 43C formed across the entire wafer while the diaphragms remain under pressure.

When the pressure represented by the arrow 51 is released, the deflecting diaphragms 43 relax and assume the configuration shown in FIG. 5, with the surface 43C then forming a concave surface. The surface 43A will assume its original substantially flat configuration. Because the wafer material indicated by the dotted lines 43B will have been removed, the convex shape of surface 43C in the center portions of the deflecting diaphragm is the reverse image of the outwardly bowed configuration of the diaphragm when under pressure.

A plurality of cell halves indicated at 10A are thus formed on a single wafer and bonded glass disc. A second indentically made wafer and glass disc is also made. To complete the processing of the sensor cell, two wafers having identical cell halves 10A and 10B are placed together as shown in FIG. 6 with the surfaces 43C of each cell half 10A and 10B facing each other. A layer of glass frit or other suitable bonding material indicated at 56 is placed between the facing surfaces of the wafers carrying sensor cells 10A and 10B.

The surfaces 43C are returned to their flat configuration as shown in FIG. 4 by applying equal pressures through the respective openings 46 on the glass discs forming the bases for the two cell halves. As shown in FIG. 6, the surfaces 43C are held flat and parallel with the glass frit material 56 between the surfaces. The two wafers 40 can be held together in a suitable fixture (not shown) to clamp the wafers in place with a force represented at F while with the glass frit material between the facing surfaces. Pressure is applied to the diaphragm with a suitable housing that overlies the openings 46, and equal, controlled pressures from sources 57 and 58 are provided to deflect the diaphragm portions, so the facing outside surfaces 43C are flat on all of the diaphragms on a wafer before the bonding takes place. The glass frit is used to bond the facing surfaces together as the surfaces 43C remain flat. Thus, controlling the pressure from sources 57 and 58 (which may be one source if desired) is important while the bonding takes place.

After the bonding material has set, the pressure from sources 57 and 58 will be released on diaphragms 43. The bond material 56 will hold the diaphragms 43 of the wafers to form for each cell, a single, unitary diaphragm indicated at 63 that have surfaces 43A held in a concave shape facing the respective flat support layers 50. The concave shape corresponds to the deflected shape of the diaphragm 63. The pressure used to bow the diaphragm sections 43 while bonding takes place will be selected to take into account the fact that the single diaphragm 63 is double thickness when assembled. The concave portion of the diaphragm is surrounded by a shallow notch at the edges or cavity 42, at the center portions of the diaphragm.

The wafers and glass discs are then cut up to form individual sensor cells 10. The diaphragm spacing from the support base or plate member 50 is shown to be exaggerated in the sensor cell of FIG. 6, but when the pressure on one of the sides of the sensor cell is exceedingly high, the opposite surface 43A will move toward the associated support base to rest against the support base 50 and the capacitor plate 47 formed thereon. The diaphragms 63 thus are supported against the flat surface of the support bases and surfaces 43 are flat when under rated overpressure. The stress in the diaphragm 63 does not exceed the allowable stress and the diaphragm 63 will be fully supported across its entire surface.

The diaphragm shapes and deflections in FIGS. 3-6 are greatly exaggerated for illustrative purposes, but the diaphragms are formed as disclosed so that they have concave surfaces facing the two support bases 50 for the diaphragm that are identical to the deflected shape of the diaphragm at a desired pressure, so that when such pressure is applied to the opposite surface of the diaphragm 63 the surface 43C facing the respective support base 50 will be substantially parallel to and rest flat against the support base when it contacts the support base. The diaphragms contact the support base to prevent excess stress in the diaphragm 63 under overpressures.

The pressures represented by arrow 51 and sources 57 and 58 will be selected to be pressures that would shape diaphragm 63 for slightly more than the maximum usable pressure range of the sensor diaphragm 63. Then the concave shapes of the surfaces 43C will be appropriate so that the diaphragm 63 will operate across the desired range of pressure but will become substantially flat and touch the respective support base member 50 before being over stressed. Again, the spacing of the diaphragm surface from the support base is shown exaggerated in the drawings. The capacitor plates 47 and the center portion of the diaphragm are sufficiently electrically conductive to permit capacitive sensing.

In FIGS. 7 and 8 a modified sensor cell is illustrated. A half cell is shown in FIG. 7, and the half cells are formed in a batch process utilizing a silicon wafer 40 and a glass disc 45 formed as described in relation to FIG. 3. The half cell comprises a support plate or base 75 made of suitable glass, and a sensing diaphragm assembly 76 made from wafer 40. The diaphragm assembly 76 includes a deflecting, pressure sensing diaphragm portion 77 made by forming a recess 78 using known techniques, such as etching. A peripheral rim 79 is formed for supporting the deflecting diaphragm at its edge. The support base 75 has a capacitor plate 82 deposited thereon, and a passageway 83 is open to the cavity 78 under the deflecting diaphragm 77. Passageway 83 is coated with metal, and a layer of metal 84 is formed on the opposite side of the glass disc 75 from the capacitor plate 82.

In this form of the invention the glass support plate or base 75 and the silicon diaphragm 76 are bonded together at the rim 79, and before separating out the individual half cell portions which are shown in FIG. 7, the silicon wafer is lapped or ground to remove material indicated in the dotted line portion 85 in FIG. 7 so the diaphragm portion 77 is to be reduced to the desired thickness.

Two silicon wafers and glass disc assemblies, each having a plurality of half cells formed as shown in FIG. 7 thereon are placed in overlying registry with a layer of bonding material between them. Individual, identical half cells are then in registry positioned as shown at 87A and 87B in FIG. 8. The wafers and glass discs are held in a suitable fixture and the half cells 87A and 87B are placed under pressure from sources indicated at 89 and 90, respectively, through the openings 83 in the half cells, to cause the deflecting diaphragm portions 77 to bow out under pressure and to compress the bonding layer 91, which in the form shown is a resilient or flowable material, such as a molten glass frit, or a resilient material that will set and become rigid after curing. The fixturing applying the holding force F is suitable for clamping the wafers and glass disc assemblies together with the bonding maaterial 91 between the two cell halves 87A and 87B. The pressures from sources 89 and 90 (which would be held to be equal) are maintained at a desired level.

Because each deflecting diaphragm portion 77 is independent of the other, facing deflecting diaphragm portion 77, the diaphragm portions bow toward each other. The material 91 flows to accommodate this bowing or deflection and then is caused to set or harden to bond the diaphragm assemblies 76 together with the deflecting diaphragm portions 77 held in their deflected shape as shown in FIG.8 to form a single sensing diaphragm 93.

Surfaces 77C that face the flat surface of the respective support bases 75 have a concave shape that is the deflected diaphragm shape when under a pressure selected to provide the desired shape. In use, when the pressures on the cell halves are unequal, for example if pressure from source 90 acting on cell half 87B reduced and pressure 89 was increased beyond the desired pressure, the differential pressure would be at a level so that the diaphragm assembly 93 would deflect, and a surface 77C of cell half 87B would be deflected to rest against the surface of the support base 75 for the cell half 87B. The surface 77C would be supported on the facing surface of support base 75 and would be substantially flat when it rested on the support base. The sensing diaphragm 93 thus will be fully supported across its entire surface under overpressure when the diaphragm surfaces are shaped as shown.

The diaphragm assembly 93 is formed of two diaphragm portions 77 bonded together, so the increased stiffness of the assembly is taken into account when selecting the pressures 89 and 90 for deflecting the diaphragm portions 77 prior to bonding them together.

It should be noted that although the sensed differential in pressure on the diaphragms may be in a relatively low range, the total static line pressure applied through the isolation diaphragms as represented by P1 and P2 in FIGS. 1 and 2, can be quite high, and actually in the range of several thousand psi in use.

As shown in FIG. 8, cell assembly 87, which has a single (but composite) diaphragm having leads indicated at 94 and 95 coming from the respectively capacitor plates 82 and the deflecting diaphragm portions 77. The deflecting diaphragm is sufficiently conductive or at least it has conductive portions sufficient to permit capacitive sensing of deflection. The plates and diaphragm portion will provide capacitive signals indicating the spacing between the plates 82 and the adjacent diaphragm portion surface. Suitable known circuitry can be used. When the diaphragm portions 77 of the two cell halves are separated by an insulating bonding layer, the leads 95 can be used for indicating individually the capacitance in the respective cell halves with respect to the capacitor plate 82 that underlies that diaphragm portion 77.

Again, the diaphragm portions form a single diaphragm assembly 93 for sensing differentials in pressure acting on the opposite surfaces. The surfaces facing the support bases 75 are shaped so the surfaces conform to the deflected shape of the sensing diaphragm assembly 93 at a desired pressure. When the diaphragm 93 is supported under overpressure, the surface supported against its respective support base 75 will be substantially flat against the flat surface of the support base 75.

A modified sensor cell such as that shown at 10 is disclosed in connection with FIGS. 9-14. In this form of the invention, batch processing again is utilized, but the steps of manufacture are somewhat different.

Referring to FIG. 9, a silicon wafer indicated generally at 100 is prepared by forming recesses or cavities 101 at desired locations to provide a thinner diaphragm section 102 in registry with these recesses. The recesses also form rim portions 103 surrounding each of the diaphragm sections. The rim portions 103 are divided when the individual sensor cell halves are cut out of the wafer as shown generally by the dotted lines 104. When divided up along lines 104, diaphragm assemblies 105 will be formed, having a rim supporting the deflecting diaphragm portions 102 at their edges. The diaphragm portions can be substantially square or round in plan view.

The silicon wafer 100 has several of the diaphragm sections 102 formed thereon and it is then mounted on to a metal tool plate indicated at 110 that has a plurality of fairly large openings 111 therein. Each opening 111 is positioned to align withone of the respective cavities 101 formed beneath the diaphragm sections 102 on the silicon wafer. A wax layer is placed between the surface of the silicon and the metal to provide a seal. A manifold shown schematically at 116 is then placed over the surface 115 of the metal tool plate and is sealed with a seal 116A to provide pressure from a source 116B in each of the cavities 101 through openings 111 to thereby bow the diaphragm sections outwardly as shown in dotted lines at 102B in FIG. 9. The metal tool plate and wafer are held together with the manifold using suitable fixturing. The outer surface of the silicon wafer 100 is then lapped (or polished) flat while pressure is maintained in the cavities 101. The thickness of the silicon wafer represented by arrow 117 is about 12.5 mils. When the pressure from source 116B is released, the diaphragm portions 102 will assume the configuration shown in FIG. 10, with an upper surface that has concave surface portions 102A, each forming a thinner diaphragm section. The surface 102D is polished to reduce the depth of the cavities 102A and also to provide a polished surface to which glass can be anoidally bonded. The concave shape then substantially conforms to the deflected shape of the diaphragm at the pressure that is provided during the lapping operation. The pressure range from pressure source 116B generally would be in the range of 50 psi for a 10 psi differential pressure sensor.

After lapping and polishing the surface 102D the silicon wafer 100 has a dimension shown at 118 of about 11.5 mils. The wafer is removed from metal tool plate 110 and the previously polished surface 102D of wafer 100 is anodically bonded to a Pyrex disc 120 that will form individual sensor support bases when the layers are cut up into individual sensor cells as shown with dotted lines 104 in FIG. 11. Each one of the sensor cells is indicated at 121. The concave surfaces 102A overlie provided openings 122 that are formed in the glass disc 120. The openings 122 are surrounded by shallow recesses 122A on the surface of the glass disc facing the silicon wafer. The recess insures that the wafer is not bonded to the glass disc in the area where the diaphragm is formed. However, the anodic bonding holds the surface 102D of rim sections 103 bonded to the glass disc 120, so that the cavities indicated at 124 beneath each of the surfaces 102A forms a pressure tight cavity.

In the next step, the recesses 101 that initially were formed in wafer 100 were removed by grinding away the part of the rim portions 103 between the cavities 101. The assembly of wafer 100 and glass disc 120 is shown in FIG. 12 with a flat outer surface 126 on the silicon wafer 100, and therefore with the silicon wafer substantially reduced in thickness, shown by dimension 125, for example, in the range of 5.3 mils in total thickness, with a minimum thickness in the diaphragm portions 102 over the cavities 124 of about 4.8 mils.

Figure 12:
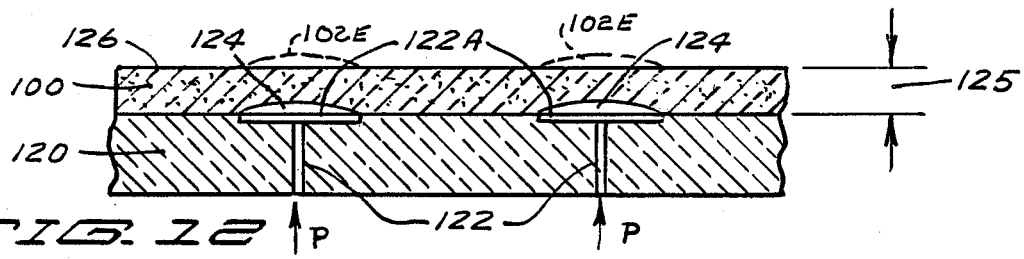
FIG. 12 is a further step in the process forming a diaphragm according to the modified form of the invention.

The bonded assembly of the silicon wafer 100 and the Pyrex or glass disc 120 will then be further processed by applying a pressure to each of the openings 121 (through the use of a manifold such as manifold 116) causing the thinner diaphragm portions 102 to bow outwardly as shown in dotted lines at 102E in FIG. 12. The surface 126 is lapped or polished flat while the pressure is being maintained in cavities 124. This pressure will be less than the pressure used in the first step because the diaphragm portions are thinner, after having been ground and lapped to the desired thickness prior to pressurizing the openings 122 in glass disc 120.

Figure 13:
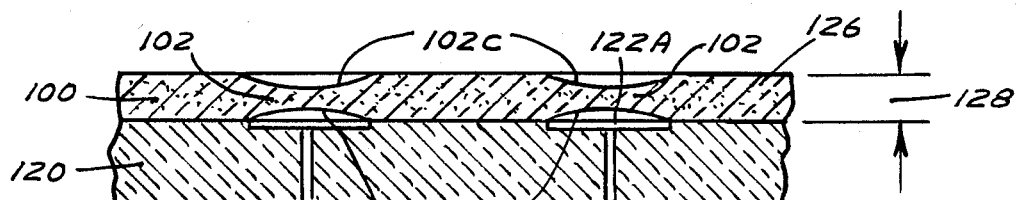
FIG. 13 shows a wafer having diaphragms formed after performing the step of FIG. 12.
Figure 14:
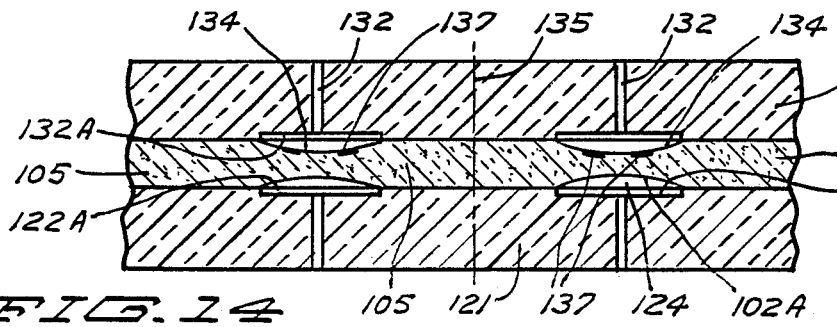
FIG. 14 is a sectional view of a batch of completed sensor cells after bonding a second support plate in place according to the modified form of the invention.

When the pressure is thereafter removed from the openings 122 and cavities 124, the deflecting diaphragm sections 102 will go back to their original position. This will leave concave surfaces 102C on the opposite side of the diaphragm section 102 from the surfaces 102A. Surfaces 102C also substantially conform to the deflected diaphragm shape when the deflecting diaphragm is subjected to pressure. As shown in FIG. 13, the surface 126 will be polished to bring the thickness to about 4.9 mils as indicated by dimension 128. Aluminum oxide can be used for a lapping or polishing agent.

Thus, the deflecting diaphragm portions 102 have curved surfaces on opposite sides forming a reduced thickness center section.

In the final step of forming sensor cells in this form of batch process, a second glass disc 130 is anodically bonded to the surface 126 of wafer 100. This second glass disc 130 also has openings 132 leading to each of the surfaces 102C, and when the disc 130 bonded in place, it can be seen that there is a cavity 134 formed on the opposite side of the silicon wafer from the cavities 124. These are shallow recesses 132A surrounding openings 132 to insure the surface 102C does not bond to the glass disc 130.

The sensor cells are then cut up along the dotted lines indicated at 135 to form individual glass bases 131 and 121 with a diaphragm assembly 105 sandwiched between them. The diaphragm assemblies 105 have deflecting portions 102 supported at rim members 103.

The pressure used for lapping or polishing the bowed surfaces has to be controlled so the bowed surface is not merely pressed flat. The lapping force is controlled relative to the pressure acting on the diaphragm, so the net force is proper. If the pressure medium acting on the diaphragm is liquid and is trapped in place (sealed off) at the appropriate pressure, then the concern over the lapping force is no longer necessary because the liquid would not let the diaphragm flatten out.

The individual sensor cells 136, when cut out along the lines 135 are formed into square sections and the sensor cells are similar to the cells 10. The cells 136 can be sandwiched between support or housing cylinders 11 and 12 as shown in FIG. 1 for sensing differential pressures.

Here, too, the shaped diaphragm surfaces 102A and 102C are such that they have substantially the concave shape of a deflected diaphragm facing the respective support base 121 or 131, so that when differential pressure is applied, for example, in cavity 134, and it reaches a maximum desired overpressure, the surface 102A will be substantially flat as it rests against the facing surface of its respective support base 121.

The opposite action occurs if the pressure in chamber 124 is greater than maximum allowable overpressure than that in chamber 134, because then the surface 102C will rest flat against the support block 131. Sensing of diaphragm deflection can be selected as desired. As shown surface 102A has strain gage resistors 137 doped thereon to sense such deflection. Both surfaces 102A and 102C may have such strain gage resistors, or the glass support bases may have deposited capacitor plates thereon for capacitive sensing, if desired.

FIG.15 shows a preferred form of clamping each of the individual sensor cells such as that shown at 10. Other sensor cells shown in the previous figures are separately numbered, but cell 10 is to represent generically the forms of sensor cells disclosed. The sensor cells are fixed between the cylinders 11 and 12 in a manner which maintains the integrity and rigidity of the sensor cells by providing adequate backing and as will be explained, the mounting can be made to provide compensation for differences in stresses on the diaphragm of the sensor cell under different static line pressure conditions.

While the physical proportion of the sensor cells shown in FIGS. 15 and 16 for example is not followed specifically in the other figures, the non-scale showings are for illustrative and explanatory purposes. It should be understood that the size (area) of the sensor cell 10 is approximately 0.2 square inches (0.45×0.45 inches square), and the overall length of the sensor assembly shown in FIG. 15 may be in the range of one (1) inch, although the illustrations are at schematic scale for illustrative purpose.

In a first form of housing, the sensor cell 10 is shown positioned between cylinders or blocks 11 and 12 as shown in FIG. 1. The schematic showing of FIG. 2 is similar. The input pressure tubes 27 and 34 pass through end caps 150 and 152, respectively, and the tubes 27 and 34 are sealingly fitted into provide openings or pressure passageways in the Pyrex or glass mounting cylinders 11 and 12. The pressure is carried completely through the Pyrex cylinder. Suitable sealing members for the input pressure tubes can be used as indicated at 151 and 153.

Pressure to be sensed is thus carried to the opposite sides of the sensor cell 10 through the glass mounting cylinders or blocks 11 and 12 and through the provided oenings in the sensor cell, for example the openings 46 in the sensor support bases 50 for the first form of the invention.

In this form of the invention, the glass mounting cylinders 11 and 12 clamp the sensor cell 10 around its periphery utilizing sealing and force transmitting support rings 155,155 on opposite sides of the cell that provide a clamping force $F_c$. The seals 155 form small, very thin chambers 156 and 157 between the outer surfaces of the cell 10 and the respective ends of mounting cylinders 11 and 12. The pressure in the tubes 27 and 34, respectively, will be present in chambers 156 and 157 on opposite sides of the sensor cell and thus the pressures act on the glass support bases 50 of the cell (or the glass support base of the other forms of the cells shown as well). The spacing between the support bases 50 and the respective mounting block is small enough so that when subjected to excessive differential pressure the glass bases will be supported on the end of the adjacent mounting cylinder 11 or 2 to prevent damage under high overpressures.

The support or housing cylinders 11 and 12 (made of Pyrex glass) have the same coefficient of thermal expansion as the glass support bases 50 and this helps in maintaining stability under different temperature conditions.

The end cap 150 acts against the base of the cylinder 11 through a Belleville spring 160 of suitable spring rate.

The end cap 152 can act through a suitable gasket 162 to hold the mounting cylinders and cell 10 in position. The clamp is set at a level which keeps the sensor cell in compression in use.

Tension carrying bolts 163 are provided for holding the end caps 150 and 152 together and provide the necessary clamping force. A semi-conductor chip 164 may be mounted on one of the glass mounting cylinders and may comprise capacitive sensing circuitry coupled to the sensor with leads 165.

A modified form of the sensor assembly is shown in FIG. 16 and in this case the end caps 150A and 152A are used, and they are held together with a sleeve 170 that is welded in place to the end caps with a sealing weld 171 at each end. The sleeve 170 is placed under tension for preloading before welding and held under tension when welded in place to clamp the end caps against mounting cylinders 11 and 12 under compression when the tension load sleeve 170 is released after welding. Compression is mounted on the sensor cell during use. A hermetic seal is formed by the welds 171 around the periphery of the end caps 150A and 152A.

The glass cylinders 11 and 12 as shown in FIG. 16 supports the glass support bases 50 of cell 10 across their entire surface with a glass frit 173 placed against the support bases 50, to provide the clamping force from tension in tube 170 (or other clamping members) across the entire exposed opposite surfaces of the sensor cell 10. Likewise, brazing indicated at 174 can be used across the entire end surface of the glass cylinder 12 for holding the cylinder 12 in place.

The tube 170 can have a suitably electrical feedthrough 175 to carry electrical signals from a semi-conductor chip 176 attached to one of the glass mounting cylinders which, again, can have capacitive sensing circuitry thereon. The chip is coupled to leads 177 from the sensor cell 10. The leads on the sensor cell are connected to circuitry on the chip 176 in a conventional manner.

What is claimed is:

1. A sensor for sensing differential pressure in a fluid and for providing an output indicative of such pressure, comprising:
    a pair of inlet means, each having a hole extending from an inlet region thereon to a substantially planar support surface thereon for conveying a fluid pressure from each inlet region to each support surface;
    diaphragm means for sensing the pressure, the diaphragm means having an outer rim sealingly bonded to both support surfaces to surround the holes, and having a deflectable region bounded by the rim for deflection by the pressure, the deflectable region having a pair of outwardly facing surfaces each having a portion with a concave shape when the deflectable region is at rest; and
    sensing means disposed in the sensor for sensing the deflection of the deflectable region and for providing an output indicative of the pressure.

2. A sensor as recited in claim 1 wherein the deflectable region is supported by one of the support surfaces when the deflectable region is deflected by an overpressure.

3. A sensor as recited in claim 1 wherein the sensing means is a strain gauge disposed on the diaphragm means.

4. A sensor as recited in claim 3 further comprising:
    a pair of flexible isolator diaphragms sealing attached to the inlet regions surrounding the holes for isolating the sensor means from the fluid; and
    a dielectric substantially incompressible fluid substantially filling the space between the isolator diaphragm and the diaphragm means for transferring pressure from the isolator diaphragm to the diaphragm means.

5. A sensor as recited in claim 1 wherein the sensing means is a capacitive means comprising a fixed conductive capacitor plate disposed on a support surface capacitively coupled to a conductive portion on the deflectable region to provide a capacitance indicative of pressure.

6. A sensor as recited in claim 1 wherein said sensor comprises a pair of sensor cell half portions, each of said half portions comprising one-half of the diaphragm means and one of the surfaces having a concave shape, two of said sensor halves being bonded together to form the diaphragm means.

7. The sensor of claim 6 wherein said sensor half portions each include a separate substantially planar support base enclosing the respective concave surface of that sensor half portion.

8. The sensor of claim 7 wherein the concave surface on each sensor half portion is formed by bowing the diaphragm portion outwardly, to form a bulge, and removing the material forming the bulge and thereafter permitting the diaphragm portion to return to its normal position.

9. A diaphragm construction for sensing pressures comprising:
    a diaphragm made of a brittle material having a deflecting portion and
    edge support for the deflecting portion;
    said diaphragm having a concave surface on at least one surface thereof, and said concave surface being formed on said diaphragm by deflecting the diaphragm portion relative to the edge support under a pressure on a surface opposite from the one surface to cause a bow in the deflecting portion; and
    removing a layer of material from the bowed portion on the one surface thereof while the opposite surface of diaphragm portion pressure is maintained under pressure to form a substantially flat surface on one surface of the deflecting portion and thereafter removing the pressure, to permit the one surface to become concave when it returns to its original position using the resulting concave shape on the one surface.

10. The diaphragm of claim 9 wherein the pressure on the opposite surface of the diaphragm portion during the forming of the concave surface is selected to be a known function of the full scale differential pressure to which the diaphragm will be subjected, so that the concave surface will become substantially flat when the load on the opposite surface of the diaphragm portion from the concave surface reaches a desired overpressure condition.

11. The diaphragm of claim 9, and means to mount said diaphragm comprising a support plate, said support plate having a substantially flat surface, said diaphragm being mounted on said support plate at its edge support with the flat surface of the support plate facing the concave surface of the diaphragm.

12. The diaphragm of claim 11 wherein said edge support comprises a rim supporting the diaphragm around the diaphragm edges.

13. The diaphragm of claim 12 wherein said brittle material is a semi-conductor.

14. The diaphragm of claim 9 wherein the diaphragm is formed to have two concave surfaces, and is formed in sequence by pressurizing the opposite sides of the diaphragm and removing material from the side that is bowed out in sequence.

15. The diaphragm of claim 14 and separate support bases mounted on opposite sides of said diaphragm and bonded to the diaphragm at the edge supports to enclose chambers on opposite sides of said diaphragm and to form a sensor cell, said support bases each having flat surfaces facing a respective concave surface on said diaphragm.

16. The sensor cell of claim 15, and means to mount said sensor cell for sensing pressure comprising mounting blocks supported on the respective support bases on opposite sides of said sensor cell, said mounting blocks being made of a material having substantially the same temperature coefficient of expansion as said support bases.

17. The apparatus as specified in claim 16 wherein said mounting blocks have central openings therein, and each of said support bases have central openings, and isolation means connected to the respective passageways in said mounting blocks and said isolation means including isolation diaphragms which when deflected from differential pressures will cause the diaphragm in said sensor cell to deflect as a function of differential pressure.

18. The sensor claim 17 including means to clamp said mounting blocks to said sensor cell, said mounting blocks having means to transmit clamping forces to the support bases only adjacent the periphery of said support bases in substantial alignment with the edge supports of the diaphragm.

19. The sensor assembly of claim 18 wherein said mounting blocks each have end surfaces that are spaced a small distance from the respective support bases of the sensor cell except at the means to transmit clamping forces to form pressure chambers, each pressure chamber being open to the pressure in the passageways in the respective support bases and massive blocks, the spacing of the support bases and the ends of the support blocks being small enough to provide support for the support bases under overpressure deflection.

20. The sensor assembly of claim 16 wherein the support bases are bonded to the respective mounting blocks across substantially the entire surface of the mounting block facing the support base.

21. The sensor assembly of claim 16 including a clamp assembly clamping the mounting blocks to the respective support bases to provide a clamping force on the mounting blocks to keep the sensor cell in compression during use.

22. A sensor construction for sensing pressures comprising first means forming a diaphragm made of a brittle, nonmetallic material having a central portion that is deflectable for measuring pressures and an edge support for the central portion, and second means comprising a support layer for the diaphragm made of a brittle, nonmetallic material, and the diaphragm being fixed to the support layer at an interface with the edge support of the diaphragm, the first and second means having facing surfaces which form stop surfaces that engage each other when the diaphragm is deflected toward the support layer from a rated overpressure in the diaphragm, one of the facing surfaces of the first and second means having a concave surface portion, said concave surface portion being a mirror image of its deflected configuration formed by deflecting one of the first and second means relative to the interface at the edge support under a pressure on a surface opposite from the one facing surface which is to have the concave surface portion to cause a bow in the one facing surface, the bowed facing surface having a layer of material removed therefrom while the opposite surface of the one means is maintained under pressure to form a substantially flat surface on the one facing surface of the one means, and thereafter removing the pressure to permit the one facing surface that was bowed to become the concave surface portion.

23. The sensor construction of claim 22 wherein the pressure applied to the one means is sufficient to cause a bow in the one means that corresponds to the bow of the diaphragm under the rated overpressure.

24. The sensor construction of claim 22 wherein the one means comprise the first means.

25. The sensor construction of claim 22 wherein the first means is made of a semiconductor material and the second means is a glass base layer.

26. The sensor construction of claim 22 wherein the first and second means are each made of a material consisting of a semiconductor and glass.

* * * * *

UNITED STATES PATENT AND TRADEMARK OFFICE
CERTIFICATE OF CORRECTION

PATENT NO.   : 4,833,920
DATED        : May 30, 1989
INVENTOR(S)  : Thomas A. Knecht et al.

It is certified that error appears in the above-identified patent and that said Letters Patent is hereby corrected as shown below:

Column 1, line 10, delete "subtantial", and insert --substantial--.

Column 1, line 30, delete "concacve", and insert --concave--.

Column 7, line 6, delete "maaterial", and insert --material--.

Column 8, line 25, delete "withone" and insert --with one--.

Column 12, lines 18-19, delete "diaphraam" and insert --diaphragms--.

Signed and Sealed this

Seventh Day of November, 1989

Attest:

JEFFREY M. SAMUELS

Attesting Officer     Acting Commissioner of Patents and Trademarks